United States Patent [19]

Akai

[11] Patent Number: 4,694,177
[45] Date of Patent: Sep. 15, 1987

[54] RADIATION DETECTOR HAVING HIGH EFFICIENCY IN CONVERSION OF ABSORBED X-RAYS INTO LIGHT

[75] Inventor: Yoshimi Akai, Yaita, Japan

[73] Assignee: Kabushiki Kaisha Toshiba, Kawasaki, Japan

[21] Appl. No.: 793,860

[22] Filed: Nov. 1, 1985

[30] Foreign Application Priority Data

Nov. 2, 1984 [JP] Japan ............................. 59-230260

[51] Int. Cl.⁴ ............................................. G01T 1/202
[52] U.S. Cl. ................................... 250/368; 250/366; 250/367; 250/370
[58] Field of Search ................ 250/370 I, 368, 370 G, 250/366, 367

[56] References Cited

U.S. PATENT DOCUMENTS

| | | | |
|---|---|---|---|
| 4,454,424 | 6/1984 | Strauss et al. | 250/368 |
| 4,491,732 | 1/1985 | Pritzkow et al. | 250/368 |
| 4,492,869 | 1/1985 | Suzuki et al. | 250/368 |
| 4,525,628 | 6/1985 | DiBianca et al. | 250/367 |

Primary Examiner—Carolyn E. Fields
Attorney, Agent, or Firm—Finnegan, Henderson, Farabow, Garrett & Dunner

[57] ABSTRACT

A light transmitting member is disposed between a scintillator element array consisting of a plurality of scintillator elements and a multichannel photodiode including a plurality of photodiode elements. Light transmitting elements of the light transmitting member are formed of a material whose light transmission factor is higher than that of the scintillator elements and which absorbs radiation (X-rays). Absorbed by the scintillator elements and the light transmitting elements, therefore, incident X-rays are prevented from being projected on the photodiode. On the other hand, light emitted from the scintillator elements is transmitted through the light transmitting member with high light transmission factor, and detected by the photodiode. Thus, the detectable quantity of light is large.

6 Claims, 5 Drawing Figures

RADIATION DETECTOR HAVING HIGH EFFICIENCY IN CONVERSION OF ABSORBED X-RAYS INTO LIGHT

BACKGROUND OF THE INVENTION

The present invention relates to a radiation detector adapted for computed tomography (hereinafter referred to as CT).

Radiation CT apparatuses, e.g., X-ray CT apparatuses of the third or fourth generation, are provided with an X-ray detector which comprises a plurality of X-ray detecting elements arranged in a high-density, one-dimensional configuration. As an example of X-ray detectors of this type, solid state X-ray detectors have recently been used frequently which employ a combination of scintillators and photodiodes in place of the conventional gas ionization chamber. In these solid state X-ray detectors, the scintillators used as X-ray detecting elements can be arranged with high density and at narrow pitches, thus permitting the production of high-resolution images.

FIG. 1 shows an X-ray detecting element array 10 (multichannel scintillator element assembly) of one such prior art X-ray detector, FIG. 2 a multichannel photodiode 15, and FIG. 3 an X-ray detector 19 assembled from the combination of the X-ray detecting element array 10 and the photodiode 15. The X-ray detecting element array 10 includes a plurality of scintillator elements 11 arranged with collimator plates 12 between and outside the same. The scintillator elements 11 and the collimator plates 12 are fixed by bonding. Usually, the collimator plates 12 used are sheets of heavy metal having a high X-ray absorption factor, such as lead or tungsten. These metal sheets are coated on both sides with a light reflecting material which can very efficiently reflect light emitted from the scintillator elements 11.

The multichannel photodiode 14 includes an insulating substrate 18, a semiconductor substrate 15 thereon, and a plurality of photodiode elements 16 as semiconductor light detecting elements arranged at the same pitches as the scintillator elements 11. Each photodiode element 16 is formed with a terminal 17 for signal output. The terminals 17 and terminals of the printed-wire assembly on the insulating substrate 18 are electrically connected by bonding the wires (not shown).

As shown in FIG. 3, the X-ray detecting element array 10 and the multichannel photodiode 14 are joined and fixed together by means of a transparent adhesive agent such as a glass adhesive so that the scintillator elements 11 individually correspond to the photodiode elements 16 in position.

The X-ray detector 19, constructed in this manner, is required to have the following properties.

(1) High X-ray absorption factor.
(2) High efficiency in conversion of absorbed X-rays into light.
(3) High light transmission factor.
(4) Fixed quantity of emitted light independent of temperature.
(5) Limited afterglow and its rapid attenuation.
(6) Emission spectrum wavelength within the range for satisfactory sensitivity of the semiconductor light detecting elements.

Scintillator materials having these properties include $Gd_2O_2S;Pr$ phosphor. This phosphor, whose luminous efficiency depends very little on temperature, may suitably be used as a scintillator for a detector of an X-ray CT apparatus, providing satisfactory images without irregular variations in magnitude of signals between channels despite the change of ambient temperature.

It is difficult, however, to grow a single crystal of the phosphor material, and it is impossible to obtain a truly satisfactory one. Practically, therefore, $Gd_2O_2S;Pr$ scintillators are necessarily formed by sintering powdered material by the hot isostatic pressing (hereinafter referred to as HIP) method. These scintillators manufactured by such sintering, however, are low in light transmission factor for the following reasons.

(1) The scintillator material itself absorbs light.
(2I) Light is scattered by voids in the sintered compact.
(3) The products are colored by impurities.

Moreover, X-ray CT apparatuses incorporating an X-ray detector using these low-transmission scintillators may be subject to the following drawbacks.

(1) Low X-ray/light detection sensitivity and low signal-to-noise ratio.
(2) Since few signals, among other detection signals, include low-energy components based on incident X-rays, the space resolution of images at low-contrast regions is poor.

Although having some advantageous properties such as high X-ray absorption factor and reduced temperature coefficient of luminous efficiency, the $Gd_2O_2S;Pr$ scintillator elements are low in light transmission factor and are not very practical for a radiation detector of X-ray CT apparatuses, owing to the inevitable use of the sintering process.

SUMMARY OF THE INVENTION

The object of the present invention is to provide a radiation detector capable of efficiently leading light emitted from scintillators formed from a sintered compact to a light detector, and enjoying several advantages, such as high X-ray absorption factor, low temperature coefficient of luminous efficiency, high X-ray detection sensitivity, high signal-to-noise ratio, and high space resolution.

In order to achieve the above object, a radiation detector according to the present invention comprises an array of scintillator elements receiving radiation and emitting light, a semiconductor light detecting member for converting the light emitted from the scintillator element array into an electrical signal, and a light transmitting member disposed between the scintillator element array and the light detecting member, the light transmitting member being formed from a material having a higher light transmission factor than that of the scintillator elements and capable of absorbing radiation.

According to the present invention, radiation incident upon the detector is absorbed by both the scintillator elements and the light transmitting member. Even though the scintillator elements are thinner than conventional ones, X-rays are not allowed to be incident upon the semiconductor light detecting member. Moreover, the scintillator elements are not expected to absorb X-rays by themselves, so that they can enjoy an optimum thickness for satisfactory light conversion efficiency. Furthermore, the light emitted from the scintillator elements can be led through the light transmitting member to the semiconductor light detecting member with high efficiency. Thus, the sensitivity, signal-to-noise ratio, and space resolution (especially at low-contrast regions) can be improved.

DETAILED DESCRIPTION OF THE PREFERRED EMBODIMENTS

Figure 1:
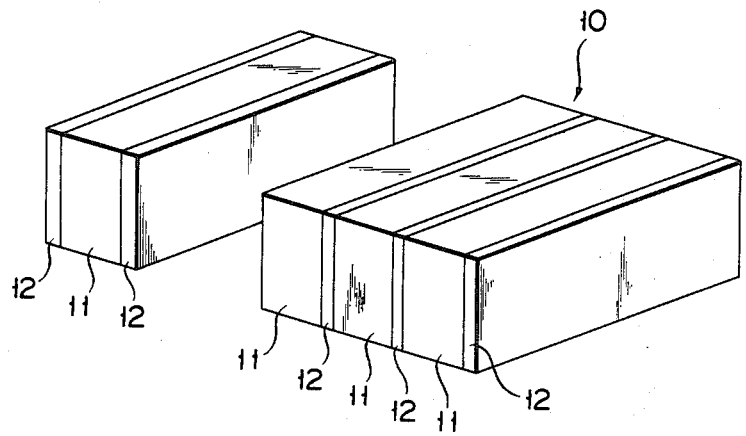
FIG. 1 is a perspective view showing a prior art multichannel scintillator element array.
Figure 2:
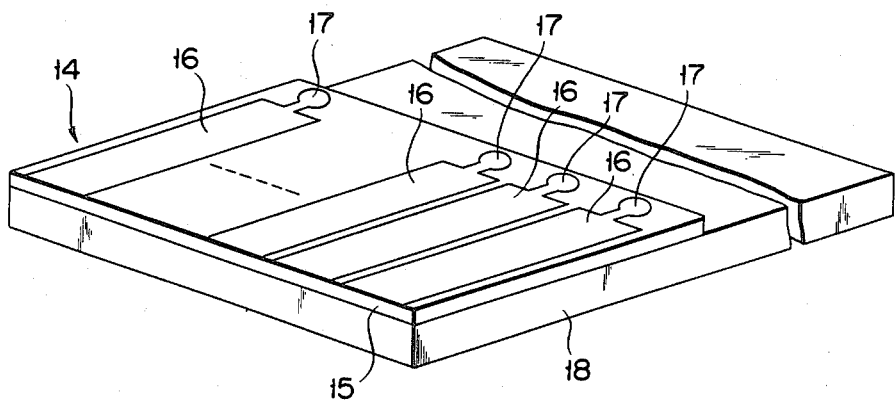
FIG. 2 is a perspective view showing a prior art multichannel photodiode.
Figure 3:
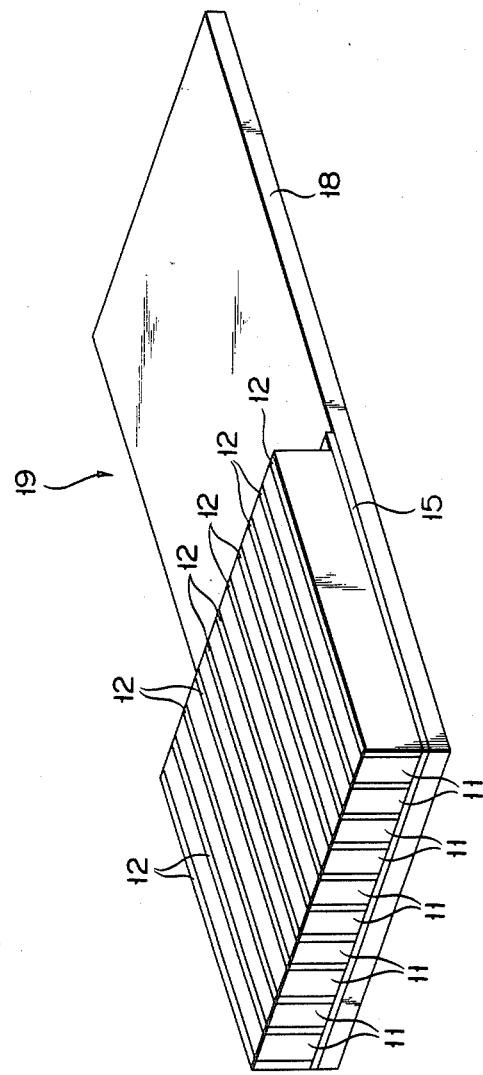
FIG. 3 is a perspective view showing a prior art multichannel radiation detector.
Figure 4:
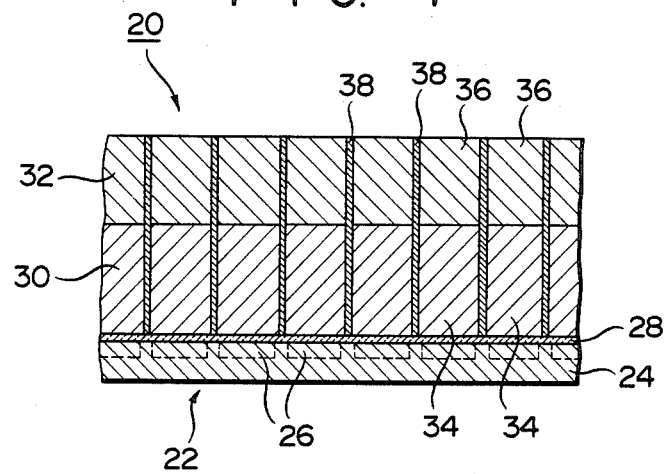
FIG. 4 is a sectional view showing a radiation detector according to an embodiment of the present invention.

In an X-ray detector 20 according to an embodiment of the present invention, as shown in FIG. 4, a light transmitting member 30 is put on a multichannel photodiode 22, and a multichannel scintillator element array 32 on the light transmitting member 30. In the multichannel photodiode 22, a plurality of photodiode elements 26 (semiconductor light detecting elements) are arranged at predetermined regular pitches or intervals on a semiconductor substrate 24.

The light transmitting member 30 is bonded to the multichannel photodiode 22 by means of a transparent adhesive layer 28. The light transmitting member 30 includes a plurality of light transmitting elements 34, and collimator plates 38 are arranged between each of the light transmitting elements 34. The light transmitting elements 34 are formed from a material such as lead fluoride ($PbF_2$) which absorbs X-rays and whose light transmission factor is higher than that of scintillator elements 36 mentioned later. The collimator plates 38, which are made of lead, tungsten or other heavy metal with high X-ray absorption factor, are coated with a light-reflective agent as required.

The scintillator element array 32 is bonded to the light transmitting member 30. The scintillator element array 32 includes a plurality of scintillator elements 36 and collimators 38 arranged between each of the scintillator elements 36. The scintillator elements 36 are formed by sintering powdered $Gd_2O_2S;Pr$ into plates.

Instead of using $Gd_2O_2S;Pr$, for example, $Gd_2O_3;Eu$, $CdWO_4$, and $ZnWO_4$ may be used for the manufacture of the scintillator elements 36. Besides $PbF_2$, moreover, $BaF_2$ and $LaF_3$ may be used for the light transmitting elements 34. Also, the scintillator elements 36 or the light transmitting elements 34 may be formed from various combinations of those materials.

Figure 5:
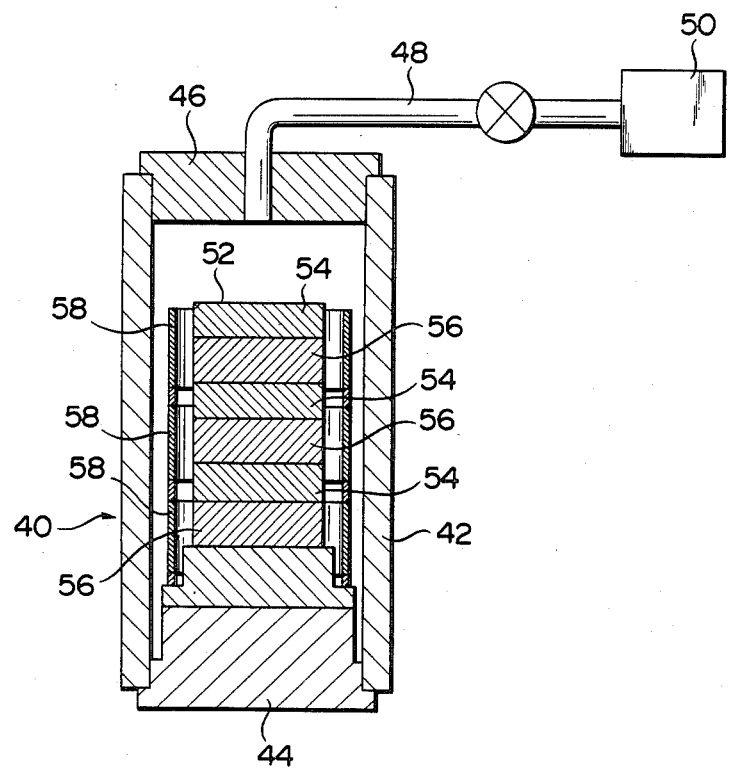
FIG. 5 is a sectional view showing an apparatus for manufacturing the radiation detector of FIG. 4.

A method for manufacturing the X-ray detector 20 will now be described. FIG. 5 is a sectional view showing an HIP apparatus 40 used for such manufacture. A loading material is placed on a bottom plate 44 of a housing 42 of a furnace. A pipe 48 coupled to a suitable gas source 50 is passed through a top plate 46 so that a gas is fed from the gas source 50 into the furnace. A capsule 52 is filled with alternate layers of a powdered material 54 for the scintillator elements 36 and a powdered material 56 for the light transmitting elements 34. Filled with the materials in this manner, the capsule 52 is put on the bottom plate 44 of the furnace housing 42. Cylindrical heaters 58 are set on the bottom plate 44 so as to surround the capsule 52.

In the HIP apparatus constructed in this manner, the capsule 52 is set in the furnace, an inert gas from the gas source 50 is fed into the furnace, and the pressure inside the furnace is adjusted to a predetermined level. Then, the heaters 58 are energized to heat the materials in the capsule 52. As the powdered materials are heated under pressure, they are sintered to form a block consisting of alternate layers of the materials of the scintillator elements 36 and the light transmitting elements 34. This block is cut parallel to the interfaces between the layers at the middle portion of each layer, forming two-layer structures each including a scintillator layer and a light transmitting layer. Thus, chips each consisting of a scintillator element 36 and a light transmitting element 34 are obtained by slicing each two-layer structure at right angles to the interface. The X-ray detector 20 as shown in FIG. 4 is manufactured by bonding these chips to the multichannel photodiode 22 with the collimators 38 interposed between the chips.

In the X-ray detector 20 according the the embodiment of the present invention, X-rays applied thereto are absorbed by the scintillator elements 36, so that a light beam is emitted. The light beam is projected on the photodiode elements 26 through the light transmitting elements 34, and converted into an electrical signal proportional to the quantity of light received by the photodiode elements 26. Although most of the incident X-rays are absorbed by the scintillator elements 36, some are transmitted through the elements 36. These transmitted X-rays, however, are absorbed by the light transmitting elements 34, so that no X-rays are allowed to be incident upon the photodiode elements 26.

Generally, in prior art X-ray detectors, the thickness of each scintillator element is greater than the thickness for a maximum detectable quantity of light (optical conversion efficiency). This is because incident X-rays must be prevented from being projected onto the photodiodes since it will result in noise in the output signal of the photodiode, so that it is necessary to secure a region wide enough for light emission even at the cost of the optical conversion efficiency in some measure. According to the present invention, however, the light transmitting member 30 is sandwiched between the scintillator element array 32 and the photodiode 22. The light transmitting elements 34 of the light transmitting member 30 not only will transmit the light from the scintillator elements 36 with almost 100 percent efficiency, but will also absorb any incident X-rays. In view of the optical conversion efficiency, therefore, the scintillator elements 36 can be adjusted to an optimal thickness. The reason is that even if the scintillator elements 36 are made thin enough to allow transmission of the X-rays, the light transmitting elements 34 will absorb the transmitted X-rays, thereby preventing the X-rays from being incident upon the photodiode elements 26. This arrangement of the light transmitting member 30 allows the light from the scintillator elements 36 to be led to the photodiode elements 26 with high efficiency, permitting the scintillator elements 36 to have an optimum thickness for satisfactory luminous efficiency. Thus, according to the present invention, the detectable quantity of light can be increased.

The table below shows X-ray absorption factors and light transmission factors obtained from examples according to the present invention and comparative examples in which the scintillator elements are bonded directly to the photodiode as in the case of the prior art arrangement. In Example 1, for instance, 95.8 percent of X-rays are absorbed by the scintillator elements, and 92.8 percent of the remaining 4.2 percent are absorbed by the $PbF_2$ light transmitting elements. Consequently, the X-ray absorption factor of the whole detector is 99.4 percent. Meanwhile, 44.7 percent of light emitted as a result of the 95.8 percent X-ray absorption is transmitted through the scintillator elements, and approximately 100 percent of the transmitted light is transmitted through the light transmitting elements to be detected by the photodiode. Thus, $95.8 \times (44.7/100)$ percent (A %) of the incident X-rays are detected by the photodiode. In Comparative Example 1, light is emitted by 99.4 percent X-ray absorption, and 20 percent of the emitted light is transmitted. As a result, $99.4 \times (20/100)$ percent (B %) of the incident X-rays are detected by the photodiodes. The detectable quantity of light (relative value) can be obtained by dividing A by B. Setting the detectable quantity of light in the comparative examples as 1, and comparing Examples 1, 2, 3 and 4 with Comparative Examples 1, 2, 3 and 4, respectively. From the table is seen that the X-ray detector of the present invention can detect light twice or thrice as much as those of the comparative examples.

and transmitted through the light-transmitting member into an electrical signal,
said light-transmitting member being stacked contiguously on the scintillator elements by hot isostatic pressing, and disposed between the scintillator elements and the light-detecting member.

2. The radiation detector according to claim 1, wherein said light-transmitting member includes a plurality of light-transmitting elements bonded individually to the scintillator elements, with pairs of the light-transmitting elements and the scintillator elements being arranged in alignment.

3. The radiation detector according to claim 2, wherein said semiconductor light detecting member includes a plurality of photodiode elements corresponding to the light transmitting elements.

4. The radiation detector according to claim 3, wherein said scintillator elements, said semiconductor light detecting member, and said light transmitting member are assembled so that a plurality of chips each consisting of a light transmitting element and a scintillator element bonded together are fixed by means of an adhesive agent on the semiconductor light detecting member with collimator plates sandwiched between the chips.

5. The radiation detector according to claim 1, wherein said scintillator elements are formed from $GdO_2S:Pr$, $Gd_2O_3:Eu$, $CdWO_4$, or $ZnWO_4$.

6. The radiation detector according to claim 5, wherein said light transmitting member is formed from $PbF_2$, $BaF_2$, or $LaF_3$.

TABLE 1

|  | $Gd_2O_3:Pr$ | | | $PbF_2$ | | | $Gd_2O_3:Pr + PbF_2$ | | Detectable quantity of light (Relative value) |
|---|---|---|---|---|---|---|---|---|---|
|  | Thickness (mm) | X-ray absorption factor (%) | Light transmission factor (%) | Thickness (mm) | X-ray absorption factor (%) | Light transmission factor (%) | Thickness (mm) | X-ray absorption factor (%) |  |
| Example 1 | 1 | 95.8 | 44.7 | 1 | 92.8 | −100 | 2 | 99.4 | 2.1 |
|  | 0.5 | 85.8 | 66.8 | 2 | 99.0 | −100 | 2.5 | 99.8 | 2.9 |
| Comparative Example 1 | 2 | 99.4 | 20 | — | — | — | — | — | 1.0 |
| Example 2 | 1 | 95.8 | 70.7 | 1 | 92.8 | −100 | 2 | 99.4 | 1.4 |
|  | 0.5 | 85.8 | 84.1 | 2 | 99.0 | −100 | 2.5 | 99.8 | 1.5 |
| Comparative Example 2 | 2 | 99.4 | 50 | — | — | — | — | — | 1.0 |
| Example 3 | 1 | 95.8 | 83.7 | 1 | 92.8 | −100 | 2 | 99.4 | 1.2 |
|  | 0.5 | 85.8 | 91.5 | 2 | 99.0 | −100 | 2.5 | 99.8 | 1.1 |
| Comparative Example 3 | 2 | 99.4 | 70 | — | — | — | — | — | 1.0 |
| Example 4 | 1 | 95.8 | 31.6 | 1 | 92.8 | −100 | 2 | 99.4 | 3.0 |
|  | 0.5 |  |  |  |  |  |  |  |  |
| Comparative Example 4 | 2 | 99.4 | 10 | — | — | — | — | — | 1.0 |

What is claimed is:

1. A radiation detector having high efficiency in conversion of absorbed X-rays into light, comprising:
scintillator elements for receiving radiation and emitting light;
a light-transmitting member formed of a material having higher light-transmission factor than that of the scintillator elements, and capable of absorbing radiation; and
a semiconductor light-detecting member for converting the light emitted from the scintillator elements